United States Patent Office 3,811,965
Patented May 21, 1974

3,811,965
PROPELLANTS CONTAINING COMBINATION
BURNING RATE SYNERGIST AND CURING
AGENT OF EPOXYALIPHATIC CARBORANE
David C. Sayles, Huntsville, Ala., assignor to the United States of America as represented by the Secretary of the Army
No Drawing. Filed Sept. 6, 1967, Ser. No. 667,049
Int. Cl. C06d 5/06
U.S. Cl. 149—19.2
10 Claims

ABSTRACT OF THE DISCLOSURE

A novel curing (chainextender) agent for carboxylated polybutadiene and acrylate binders which also functions as a burning rate synergist for use in composite propellant compositions. Specifically, the use of 1-(2,3-epoxyaliphatic)carboranes such as 1-(2,3-epoxybutyl)carborane and 1,2-bis(2,3-epoxyaliphatic)carboranes such as 1,2-bis (2,3-epoxypropylcarborane as novel curing agents for use in composite propellant compositions is disclosed. The aliphatic group should have at least 3 carbon atoms in the chain.

DEDICATORY CLAUSE

The invention described herein may be manufactured, used, and licensed by or for the Government for governmental purposes without the payment to me of any royalty thereon.

BACKGROUND OF THE INVENTION

This invention relates to a novel combination burning rate synergist and curing agent for use in composite propellant compositions, and particularly, such a curing agent for use in carboxylated polybutadiene and acrylate binders used in composite propellant compositions.

In the past twenty-five years or so, great interest has developed in solid propellants for jet propulsion devices such as missiles, rocket motors, gas generators and the like. One type of solid propellant composition which has received considerable attention is that of the composite type; a typical composite propellant composition being one that uses an organic material as the fuel and binder, and a solid oxidant such as ammonium perchlorate. In this type of propellant composition, particularly when the propellant composition comprises a major proportion of a crystalline oxidizer and a minor proportion of the fuel and binder, the problem is presented of adjusting the physical properties of the propellant composition because of the small proportion of the binder material. Thus, it is difficult to provide suitable adhesion to the particles of oxidizer, and the matrix of binder material is so tenuous that it is difficult to provide sufficient strength and elasticity in the propellant composition structure. Also, in many cases it is desirable and necessary to be able to cast or pour the propellant composition into a rocket case or mold and then cure to a solid having suitable mechanical or physical properties. In addition, since the binder also forms a fuel or part of the fuel, it must have suitable chemical properties for this purpose. In particular, it must have a high, adjustable and easily controllable burning rate.

Accordingly, it is an object of this invention to provide a novel composite propellant composition which has a burning rate considerably above conventional composite propellant compositions.

It is another object of this invention to provide novel composite propellant compositions which have burning rates that may be adjusted, in a controlled manner, by the substitution of a portion (or all) of the conventional curing agent with a novel curing agent.

A particular object of this invention is to provide such a novel combination curing agent and burning rate synergist which may be used in carboxylated polybutadiene and acrylate propellant binders.

SUMMARY OF THE INVENTION 1-(2,3-epoxyaliphatic)carboranes having at least 3 carbon atoms in the aliphatic chain may be used as combination curing agents and burning rate synergists for carboxylated polybutadiene and acrylate binders for use in

DESCRIPTION OF THE PREFERRED EMBODIMENTS

This invention employs a novel group of chemical compounds for use as combination crosslinking agents and burning rate synergists for carboxylated polybutadiene and acrylate binders. Specifically, 1-(2,3-epoxypropyl)-carborane is such a compound. Other 1-(2,3-epoxyaliphatic)carboranes may also be used. The aliphatic chain should have at least 3 carbon atoms.

1-(2,3-epoxypropyl)carborane can be synthesized as follows:

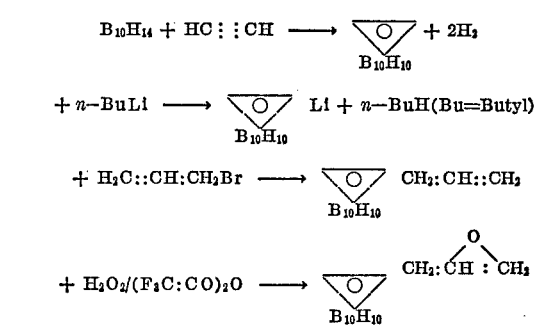

Additionally, 1,2 - bis(2,3 - epoxyaliphatic)carboranes such as 1,2-bis(2,3-epoxypropyl)carborane can be employed. The aliphatic group should have at least 3 carbon atoms. Of course, mixtures of carborane compounds of this invention may also be used.

Similarly, 1,2-bis(2,3-epoxypropyl)carborane can be prepared as follows:

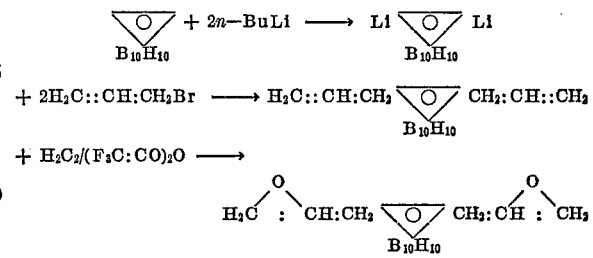

The use of the novel crosslinking agent of this invention in carboxylated polybutadiene binders can best be illustrated by considering 1-(2,3-epoxypropyl)carborane as an example:

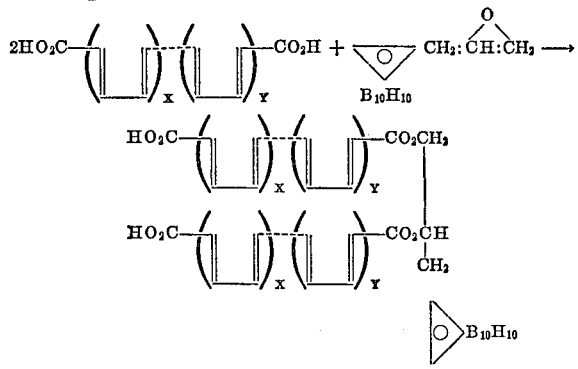

In more general terms, the carborane compound of this invention is reacted with a synthetic solid polymer (after all of the propellant ingredients have been combined) formed by reacting an uncured polymer having at least 2 carboxylic groups, terminally or randomly located, of a monomer which can be butadiene, a substituted butadiene or an acrylate. A particularly desirable homopolymer is polybutadiene. A particularly desirable heteropolymer is a copolymer of butadiene and acrylic acid.

The primary function of the carborane compound is to chain extend the binder. It is not present in a sufficient amount to synthesize a binder containing the carborane compound.

The binder of this invention is particularly attractive for use in high acceleration, high burning rate boosters and in the solid fuel grain for composite propellant compositions. A marked increase in burning rates is achieved without any sacrifice in mechanical properties.

The novel solid propellant compositions of this invention contain as oxidizer an inorganic oxidizing salt. Particularly useful inorganic oxidizing salts include the ammonium, alkali metal, and alkaline earth metal salts of nitric, perchloric and chloric acids and mixtures thereof, such as sodium, potassium, magnesium and ammonium perchlorates, lithium and strontium chlorates, and potassium, sodium, calcium and ammonium nitrates.

The solid propellant compositions of this invention can can contain, in addition to the inorganic oxidizing salt and binder, a powdered metal and various compounding ingredients commonly employed in making composite propellants, such as plasticizers, oxidation inhibitors, reinforcing agents, wetting agents, modifiers, vulcanizing agents, curing agents, accelerators, burning rate catalysts, and the like. The propellant composition can be formed into a grain having any desired shape or geometry, such as grains of the internal, external and internal-external burning types. These grains can be molded or extruded and can be restricted with any suitable and well-known restricting material, such as rubber.

Examples of particularly desirable metals are aluminum, boron, magnesium, beryllium and the like. Alloys can also be used such as the aluminum alloys of boron, magnesium, manganese, copper and the like. Silicon can also be utilized and the term "metal" is used herein to include silicon. Generally the components of the solid propellant compositions of this invention are present in the relative amounts of 50–90 percent inorganic oxidizing salt, 10–25 percent acidic binder polymer and 0–25 percent powdered metal.

The following table compares a "standard" propellant composition (Composition A) having a carboxyl-terminated polybutadiene prepolymer with Composition B and Composition C of this invention.

| Ingredient, wt. percent: | Composition A | Composition B | Composition C |
|---|---|---|---|
| Ammonium perchlorate | 68.0 | 68.0 | 68.0 |
| Aluminum | 14.0 | 14.0 | 14.0 |
| Carboxyl-terminated polybutadiene prepolymer | 10.5 | 10.5 | 10.5 |
| n-Butylferrocene | 7.0 | 7.0 | 3.5 |
| Tris(methylaziridinyl)-phosphine oxide | 0.2 | 0.2 | 0.2 |
| Tris(oxiranyl)-para-aminophenol | 0.2 | | |
| Iron linoleate | 0.05 | 0.05 | 0.05 |
| Lecithin | 0.05 | 0.05 | 0.05 |
| 1,2-bis(2,3-epoxypropyl)carborane | | 0.2 | 0.2 |
| 1-(2,3-epoxypropyl)carborane | | | 3.5 |
| Burning rate (1,000 p.s.i.) inches per second | 1.2 | 1.6 | 1.9 |

The novel solid propellant compositions of this invention can be used in various jet propulsion devices such as rocket motors similar to that illustrated in U.S. Pat. No. 3,087,844.

Various other modifications and variations of this invention will become readily apparent to those skilled in the art in the light of the above teachings, which modifications and variations are within the spirit and scope of this invention.

What is claimed is:
1. A solid propellant composition comprising: an inorganic oxidizing salt and a binder, said binder being formed by reacting a polymer containing at least 2 carboxylic groups, terminally or randomly located, with a reactant material in sufficient amount to provide a solid binder on reacting with said polymer, said material comprising a 1-(2,3-epoxyaliphatic)carborane or a 1,2-bis(2,3-epoxyaliphatic)carborane, said carborane having at least 3 carbon atoms in the aliphatic group thereof, said polymer being formed from a monomer comprising butadiene, substituted butadienes or acrylates.

2. The composition of claim 1 in which said polymer is a polymer of butadiene and said reactant material is 1-(2,3-epoxypropyl)carborane.

3. The composition of claim 2 in which said polymer is polybutadiene and said inorganic oxidizing salt is ammonium perchlorate.

4. The composition of claim 1 in which said polymer is a polymer of butadiene and said reactant material is 1,2-bis(2,3-epoxypropyl)carborane.

5. The composition of claim 4 in which said polymer is polybutadiene and said inorganic oxidizing salt is ammonium perchlorate.

6. The composition of cliam 1 in which said polymer is a copolymer of butadiene and acrylic acid.

7. The composition of claim 6 in which said reactant material is 1-(2,3-epoxypropyl)carborane.

8. The composition of claim 7 in which said inorganic oxidizing salt is ammonium perchlorate.

9. The composition of claim 6 in which said reactant material is 1,2-bis(2,3-epoxypropyl)carborane.

10. The composition of claim 9 in which said inorganic oxidizing salt is ammonium perchlorate.

References Cited
UNITED STATES PATENTS

| | | | |
|---|---|---|---|
| 2,622,277 | 12/1952 | Bonell et al. | 149—19 X |
| 3,121,119 | 2/1964 | Heying | 149—22 X |
| 3,247,256 | 4/1966 | Fein et al. | 149—22 X |
| 3,266,958 | 8/1966 | Breazeale | 149—19 |

BENJAMIN R. PADGETT, Primary Examiner

U.S. Cl. X.R.

149—22